(12) United States Patent
Stokman et al.

(10) Patent No.: US 11,210,499 B2
(45) Date of Patent: Dec. 28, 2021

(54) DETERMINING A SOCIAL GROUP TO WHICH CUSTOMERS BELONG FROM APPEARANCE AND USING ARTIFICIAL INTELLIGENCE, MACHINE LEARNING, AND COMPUTER VISION, FOR ESTIMATING CUSTOMER PREFERENCES AND INTENT, AND FOR IMPROVING CUSTOMER SERVICES

(71) Applicant: Kepler Vision Technologies BV, Amsterdam (NL)

(72) Inventors: Henricus Meinardus Gerardus Stokman, Amsterdam (NL); Marc Jean Baptist van Oldenborgh, Amsterdam (NL)

(73) Assignee: Kepler Vision Technologies BV, Amsterdam (NL)

( * ) Notice: Subject to any disclaimer, the term of this patent is extended or adjusted under 35 U.S.C. 154(b) by 0 days.

(21) Appl. No.: 16/029,072

(22) Filed: Jul. 6, 2018

(65) Prior Publication Data
US 2020/0387692 A1 Dec. 10, 2020

(51) Int. Cl.
*G06K 9/00* (2006.01)
*G06F 16/9536* (2019.01)

(52) U.S. Cl.
CPC ..... *G06K 9/00288* (2013.01); *G06F 16/9536* (2019.01); *G06K 9/00362* (2013.01)

(58) Field of Classification Search
CPC ........... G06K 9/00677; G06K 9/00288; G06K 9/00362; G06K 9/00369; G06K 9/6271;
(Continued)

(56) References Cited

U.S. PATENT DOCUMENTS

| 8,688,782 B1* | 4/2014 | Lin ........................ G06Q 50/01 709/204 |
| 2009/0116698 A1 | 5/2009 | Zhang et al. |

(Continued)

OTHER PUBLICATIONS

Song et al., "Predicting Occupation vie Human Clothing and Context", 2011 IEEE International Conference on Computer Vision, pp. 1084-1091 (Year: 2011).*

(Continued)

*Primary Examiner* — Nay A Maung
*Assistant Examiner* — Jose M Torres
(74) *Attorney, Agent, or Firm* — Jordan IP Law, LLC; Todd A. Vaughn

(57) ABSTRACT

An artificial intelligence (AI) system for determining to which social group a person belongs. The AI system includes a computer system and a computer program product which, when running on the computer system, is to: retrieve at least one image of the person belonging to a social group; labels the person, resulting in a labeled person; retrieve at least one image part showing appearance of the labeled person; subject said at least one image part to at least one trained machine learning model defined in the computer program product, the machine learning model including at least a part that is trained on a test set of annotated images which are annotated with respect to categories that correlate to social group, and determine from the at least one trained machine learning model a social group category to which the labeled person belongs.

9 Claims, 5 Drawing Sheets

Figure 1:
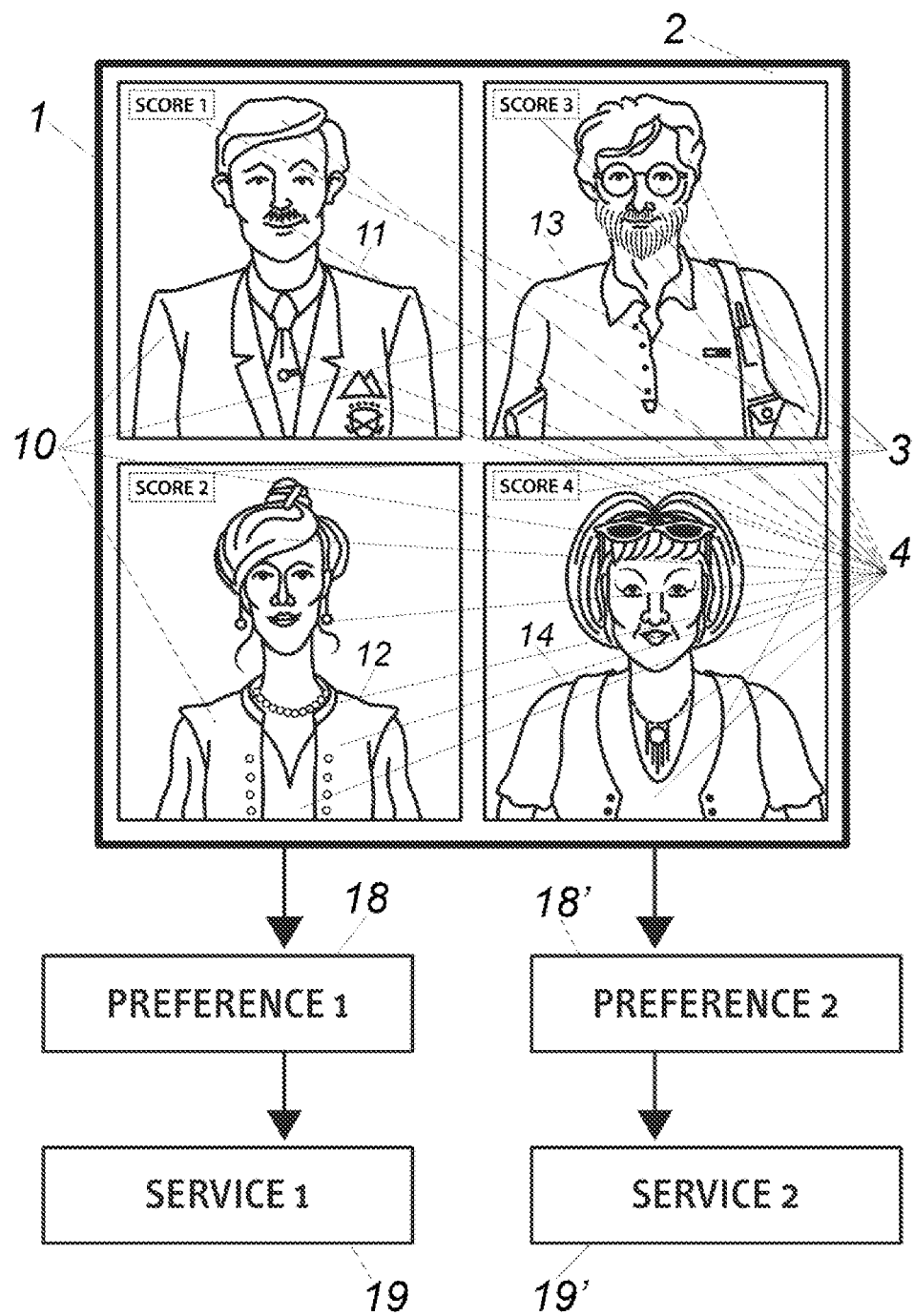

(58) Field of Classification Search
CPC ............ G06F 16/9536; G06Q 30/0204; G06Q 30/0631
See application file for complete search history.

(56) References Cited

U.S. PATENT DOCUMENTS

| | | | | |
|---|---|---|---|---|
| 2009/0192967 | A1* | 7/2009 | Luo | G06N 7/005 |
| | | | | 706/47 |
| 2010/0179874 | A1* | 7/2010 | Higgins | G06Q 30/02 |
| | | | | 705/14.53 |
| 2011/0188742 | A1* | 8/2011 | Yu | G06K 9/00677 |
| | | | | 382/159 |
| 2011/0274314 | A1 | 11/2011 | Yang et al. | |
| 2012/0027304 | A1* | 2/2012 | Brown | G06K 9/469 |
| | | | | 382/190 |
| 2013/0066750 | A1* | 3/2013 | Siddique | G06Q 30/0601 |
| | | | | 705/27.2 |
| 2013/0343615 | A1 | 12/2013 | Zhang et al. | |
| 2015/0086110 | A1* | 3/2015 | Nishimura | G06K 9/6234 |
| | | | | 382/155 |
| 2015/0242707 | A1* | 8/2015 | Wilf | G06K 9/6256 |
| | | | | 382/159 |
| 2016/0224871 | A1* | 8/2016 | Koren | G06K 9/6284 |
| 2019/0220900 | A1* | 7/2019 | Tazuke | G06Q 30/0269 |

OTHER PUBLICATIONS

Sami Jaha et al., "From Clothing to Identity: Manual and Automatic Soft Biometrics", IEEE Transactions on Information Forensics and Security, vol. 11, No. 10, Oct. 2016, pp. 2377-2390 (Year: 2016).*

Shao et al., "What Do You Do? Occupation Recognition in a Photo via Social Context", 2013 IEEE International Conference on Computer Vision, pp. 3631-3638 (Year: 2013).*

Aghaei et al., "Clothing and People—A Social Signal Processing Perspective", 2017 12th IEEE International Conference on Automatic Face and Gesture Recognition, pp. 532-537 (Year: 2017).*

Hong et al., "Understanding Blooming Human Groups in Social Networks," IEEE Transactions on Multimedia, vol. 17, No. 11, Nov. 2015, pp. 1980-1988 (Year: 2015).*

M. Kiapour et al., "Hipster Wars: Discovering Elements of Fashion", Computer Vision—ECCV 2014: 13th European Conference, Sep. 2014, 16 pages.

W. H. Lin et al., "Netizen-Style Commenting on Fashion Photos: Dataset and Diversity Measures", WWW—18 Proceedings of The Web Conference, Jan. 2018, 8 pages.

W. Zhang et al., "Real-time clothes comparison based on multi-view vision", 2nd ACM/IEEE International Conference on Distributed Smart Cameras, Sep. 2008, 10 pages.

Y-C. Chen et al., "Facelet-Bank for Fast Portrait Manipulation", CoRR, Mar. 2018, 9 pages.

* cited by examiner

DETERMINING A SOCIAL GROUP TO WHICH CUSTOMERS BELONG FROM APPEARANCE AND USING ARTIFICIAL INTELLIGENCE, MACHINE LEARNING, AND COMPUTER VISION, FOR ESTIMATING CUSTOMER PREFERENCES AND INTENT, AND FOR IMPROVING CUSTOMER SERVICES

TECHNICAL FIELD

The invention relates to an artificial intelligence (AI) system.

BACKGROUND

Artificial intelligence (AI) is developing rapidly and AI applications are supporting or will support all industries including the aerospace industry, agriculture, chemical industry, computer industry, construction industry, defense industry, education industry, energy industry, entertainment industry, financial services industry, food industry, health care industry, hospitality industry, information industry, manufacturing, mass media, mining, telecommunication industry, transport industry, water industry and direct selling industry.

Human-machine communication becomes more and more important. Machines (such as computers, smartphones, tablets and robots) are penetrating society rapidly.

Appearance is reflecting who people are or want to be. Therefore, the understanding of people's appearance by machines would improve human-machine communication and would help machines to estimate people's preferences and intent, and offer them personalized services.

Artificial intelligence and machine learning, in particular, computer vision, can be used to detect and analyze people's appearance.

U.S. Patent Publication No. 20110274314, entitled "Real-time clothing recognition in surveillance videos", according to its abstract describes "Systems and methods are disclosed to recognize clothing from videos by detecting and tracking a human; performing face alignment and occlusal detection; and performing age and gender estimation, skin area extraction, and clothing segmentation to a linear support vector machine (SVM) to recognize clothing worn by the human."

U.S. Patent Publication No. 20130343615, entitled "Identifying a style of clothing based on an ascertained feature", according to its abstract describes "Examples disclose a method executed on a computing device to locate a clothing region within an image to segment into a region of related clothing. Further, the examples provide detecting a feature of the related clothing. Additionally, the examples also disclose determining a style of the related clothing in the region based on the detection of the feature."

U.S. Patent Publication No. 20090116698, entitled "Intelligent fashion exploration based on clothes recognition", according to its abstract describes "One embodiment of the present invention provides a system for recognizing and classifying clothes. During operation, the system captures at least one image of a clothing item. The system further determines a region on the captured image which corresponds to a torso and/or limbs. The system also determines at least one color composition, texture composition, collar configuration, and sleeve configuration of the clothing item. Additionally, the system classifies the clothing item into at least one category based on the determined color composition, texture composition, collar configuration, and sleeve configuration. The system then produces a result which indicates the classification."

In "Hipster Wars: Discovering Elements of Fashion Styles," European Conference on Computer Vision, pp. 472-488, September 2014, by M. Hadi Kiapour et al., according to its abstract describes "The clothing we wear and our identities are closely tied, revealing to the world clues about our wealth, occupation, and socio-identity. In this paper we examine questions related to what our clothing reveals about our personal style. We first design an online competitive Style Rating Game called Hipster Wars to crowd source reliable human judgments of style. We use this game to collect a new dataset of clothing outfits with associated style ratings for 5 style categories: hipster, bohemian, pinup, preppy, and goth. Next, we train models for between-class and within-class classification of styles. Finally, we explore methods to identify clothing elements that are generally discriminative for a style, and methods for identifying items in a particular outfit that may indicate a style."

In "Netizen-Style Commenting on Fashion Photos: Dataset and Diversity Measures", WWW 2018, January 2018, by Wen Hua Lin et al. according to its abstract describes "Recently, deep neural network models have achieved promising results in image captioning task. Yet, "vanilla" sentences, only describing shallow appearances (e.g., types, colors), generated by current works are not satisfied netizen style resulting in lacking engagements, contexts, and user intentions. To tackle this problem, we propose Netizen Style Commenting (NSC), to automatically generate characteristic comments to a user-contributed fashion photo. We are devoted to modulating the comments in a vivid "netizen" style which reflects the culture in a designated social community and hopes to facilitate more engagement with users. In this work, we design a novel framework that consists of three major components: (1) We construct a large-scale clothing dataset named NetiLook, which contains 300 K posts (photos) with 5 M comments to discover netizen-style comments. (2) We propose three unique measures to estimate the diversity of comments. (3) We bring diversity by marrying topic models with neural networks to make up the insufficiency of conventional image captioning works. Experimenting over Flickr30k and our NetiLook datasets, we demonstrate our proposed approaches benefit fashion photo commenting and improve image captioning tasks both in accuracy and diversity."

In "Real-time clothes comparison based on multi-view vision", by Wei Zhang et al., 2nd ACM/IEEE International Conference on Distributed Smart Cameras (ICDSC), (2008) according to its abstract describes "In this paper, we describe the intelligent multi-view vision technology for the Responsive Mirror, an implicitly controlled human-computer interaction system for clothes fitting rooms that allows a shopper for real-time "self" and "social" clothes comparisons. A robust motion-tracking component is designed which automatically track user's body orientations and poses as she tries on clothes. And computer vision and machine learning techniques are employed to recognize the factors that human eyes perceive in term of clothing similarity from frontal-view outfit images. We describe the key components of the motiontracking and clothes-recognition systems and evaluate their performance by user study and experiments on a simulated clothes fitting image dataset. The approach and results presented here will benefit designers and developers of similar applications in the future."

In "Facelet-Bank for Fast Portrait Manipulation", Ying-Cong Chen et al., IEEE/CVF Conference on Computer Vision and Pattern Recognition (march 2018) according to its abstract describes "Digital face manipulation has become a popular and fascinating way to touch images with the prevalence of smartphones and social networks. With a wide variety of user preferences, facial expressions, and accessories, a general and flexible model is necessary to accommodate different types of facial editing. In this paper, we propose a model to achieve this goal based on an end-to-end convolutional neural network that supports fast inference, edit-effect control, and quick partial-model update. In addition, this model learns from unpaired image sets with different attributes. Experimental results show that our framework can handle a wide range of expressions, accessories, and makeup effects. It produces high-resolution and high-quality results in fast speed."

SUMMARY

The invention allows an apparatus or device or system to determine a social group, a person belongs to by analyzing the person's appearance. This allows, after the social group of the person is determined, to estimate the person's preferences and intent. The preferences and intent can be used to approach the person, to communicate with the person, and to offer the person product and services that fit him/her.

To that end, there is provided an artificial intelligence (AI) system for determining to which social group a person belongs, said AI system comprising a computer system and a computer program product which, when running on said computer system:

retrieves at least one image of said person belonging to a social group;
labels said person in said at least one image, resulting in a labeled person;
retrieves at least one image part showing appearance of said labeled person;
subjects said at least one image part to at least one trained machine learning model defined in said computer program product, said machine learning model comprising at least a part that is trained on a test set of annotated images which are annotated with respect to categories that correlate to social group, and
determines from said at least one trained machine learning model a social group category to which the labeled person belongs.

In an embodiment, appearance is at least one selected from how the person is dressed, and how the person is groomed.

In an embodiment, the appearance is at least one selected from clothes, shoes, makeup, glasses, accessories, dental brace, and hairstyle of a person.

In an embodiment, the AI system retrieves at least one image comprising a series of persons, and for said series of persons determines said social group category.

In an embodiment, the AI system further comprises a statistical analyzer for applying a statistical analysis on said social group categories of said series of persons for determining demographics of said series of persons.

In an embodiment, the AI system determines said social group categories real-time.

There is further provided a robot system comprising the artificial intelligence (AI) system, wherein said robot system comprises a humanoid robot for interacting with human beings.

There is further provided a camera comprising the AI system.

In an embodiment, of the camera, it comprises a housing including said AI system.

The social group is defined as any set of human beings who either are, recently have been, or anticipate being in some kind of interrelation. The term "social group" is used to designate many kinds of aggregations of humans. Social groups come in a myriad of sizes and varieties. For example, social groups could consist of: high educated people, sportive people, students, dancers, babies, policemen, rich people, deprived people, congress members, and farmers.

The appearance of a person is defined how the person is dressed and groomed. Appearance is set by clothes, shoes, makeup, glasses, accessories, dental brace and hairstyle of a person.

In order to detect and localize a person in a scene from a retrieved image an embodiment uses a method to detect persons. Such a method will use machine learning techniques (mainly deep learning) to design and train a model which detects persons given an input of a visual representation, e.g. an RGB image, as the system perceives. The model is trained on a large amount of annotated data; it comprises images with and without persons and locations of the persons are annotated.

In the case of deep learning, a detection framework such as Faster-RCNN, SSD, R-FCN, Mask-RCNN, or one of their derivatives can be used. A base model structure can be VGG, AlexNet, ResNet, GoogLeNet, adapted from the previous, or a new one. A model can be initialized with weights and trained similar tasks to improve and speedup the training. Optimizing the weights of a model, in case of deep learning, can be done with the help of deep learning frameworks such as Tensorflow, Caffe, or MXNET. To train a model, optimization methods such as Adam or RMSProb can be used. Classification loss functions such Hinge Loss or Softmax Loss can be used. Other approaches which utilize handcrafted features (such as LBP, SIFT, or HOG) and conventional classification methods (such as SVM or Random Forest) can be used.

To detect bodily features, the system in an embodiment can determine key points on the body (e.g. hands, shoulders, knees, etc.) of a person.

To detect the key points on the body of a person, in an embodiment the system comprises a model that is designed and trained for this detection. The training data to train the model comprises an annotation of various key points locations. When a new image is presented, the model allows identification of the locations of such key points. To this end, the system can utilize existing key point detection approaches such as MaskRCNN or CMU Part Affinity Fields. The training procedure and data can be customized to best match the context of the content of the retrieved images. Such context may comprise an indoor context (like a home, a shop, an office, a station, an airport, a hospital, a theatre, a cinema etc.) or an outdoor context (like a beach, a field, a street, a park etc.) wherein there are changing lighting conditions.

In order to detect clothing and accessories on a person from a retrieved image, an embodiment uses machine learning techniques (mainly deep learning) to design and train a model which detects clothing and accessories on a person, given an input of a visual representation, e.g. RGB image, as the system perceives. The model is trained on a large amount of annotated data; it comprises images persons wearing different clothes and accessories wherein the clothes and accessories are annotated. Annotation can include general clothing style (e.g. classic, winter, sexy, wedding, etc.), clothing category (e.g. T-shirt, hoodie, skirt, dress, underwear, swimsuit, etc.), attributes of clothing (e.g. texture, print, etc.), accessories category (bracelet, watch, necklace, cap, hat, etc.), and attributes of accessories (e.g. shape, reflection, etc.).

In an embodiment, after detecting key points on the body of a person, the body is segmented in relevant body parts; i.e. head, torso and lower body. Subsequently a deep neural network (DNN) is trained for each body part to detect clothing and accessories.

For example, a pretrained DNN on ImageNet, e.g. VGG-Net, AlexNet, ResNet, Inception and Xception, can be adapted by taking the convolution layers from these pretrained DNN networks, and on top of them adding new layers specially designed for clothes and accessories recognition, and train the network as for the model.

In order to detect appearance of a person from a retrieved image, an embodiment uses machine learning techniques (mainly deep learning) to design and train a model which detects the appearance of a person, given an input of a visual representation, e.g. an RGB image, as the system perceives. The model is trained on a large amount of annotated data; it comprises images persons wearing different clothes, wearing different accessories, being differently groomed, and having a different haircut, wherein the appearance of the person is annotated. Annotation includes appearance style; e.g. business, casual, modest, sexy, groomed, etc.

In an embodiment, after localizing a person in a scene from a retrieved image, a deep neural network (DNN) is trained to detect appearance the person.

In another embodiment, after detecting clothing and accessories on a person from a retrieved image, a deep neural network (DNN) is trained to detect appearance the person.

For example, a pretrained DNN on ImageNet, e.g. VGG-Net, AlexNet, ResNet, Inception and Xception, can be adapted by taking the convolution layers from these pretrained DNN networks, and on top of them adding new layers specially designed for appearance recognition, and train the network as described for the model.

In order to determine a social group to which a person belongs from a retrieved image, an embodiment uses machine learning techniques (mainly deep learning) to design and train a model which determines the social group to which a person belongs, given an input of a visual representation, e.g. an RGB image, as the system perceives. The model is trained on a large amount of annotated data; it comprises images persons with annotated different appearances, wherein the social group to which the person belongs is annotated. Annotation includes social groups; e.g. high educated people, sportive people, students, dancers, babies, policemen, rich people, deprived people, congress members, and farmers.

In an embodiment, after detecting the appearance of a person from a retrieved image, a deep neural network (DNN) is trained to determine the social group to which a person belongs.

For example, a pretrained DNN on ImageNet, e.g. VGG-Net, AlexNet, ResNet, Inception and Xception, can be adapted by taking the convolution layers from these pretrained DNN networks, and on top of them adding new layers specially designed for appearance recognition, and train the network as described for the model.

A humanoid robot can be defined as robot with its body shape built to resemble the human body. This can be done for functional purposes, such as interacting with human tools and environments. In general, humanoid robots have a torso, a head, two arms, and two legs. Some forms of humanoid robots may model only part of the body, for example, from the waist up. Some humanoid robots also have heads that are designed to replicate human facial features. These features can for instance be eyes, mouths, and the like. Androids can be defined as humanoid robots that are built to aesthetically resemble humans.

The term "statistically" when used herein, relates to dealing with the collection, analysis, interpretation, presentation, and organization of data. The analysis may be presented into visual formats like graphs, or other known graphical representations and/or tables.

Real-time The term "near real-time" or "nearly real-time" (NRT), in telecommunications and computing, refers to the time delay introduced, by automated data processing or network transmission, between the occurrence of an event and the use of the processed data, such as for display or feedback and control purposes. For example, a near-real-time display depicts an event or situation as it existed at the current time minus the processing time, as nearly the time of the live event.

The distinction between the terms "near real time" and "real time" is somewhat nebulous and must be defined for the situation at hand. The term implies that there are no significant delays. In many cases, processing described as "real-time" would be more accurately described as "near real-time". In fact, this may also be described as "functionally real-time".

Near real-time also refers to delayed real-time transmission of voice and video. It allows playing video images, in approximately real-time, without having to wait for an entire large video file to download. Incompatible databases can export/import to common flat files that the other database can import/export on a scheduled basis so that they can sync/share common data in "near real-time" with each other.

Real-time signal processing is necessary, but not sufficient in and of itself, for live signal processing such as what is required in live event support. Live audio digital signal processing requires both real-time operation and a sufficient limit to throughput delay so as to be tolerable to performers using stage monitors or in-ear monitors and not noticeable as lip sync error by the audience also directly watching the performers. Tolerable limits to latency for live, real-time processing is a subject of investigation and debate but is estimated to be between 6 and 20 milliseconds.

A real-time system has been described in Wikipedia as one which "controls an environment by receiving data, processing them, and returning the results sufficiently quickly to affect the environment at that time". The term "real-time" is also used in simulation to mean that the simulation's clock runs at the same speed as a real clock, and in process control and enterprise systems to mean "without significant delay".

The distinction between "near real-time" and "real-time" varies, and the delay is dependent on the type and speed of the transmission. The delay in near real-time is typically of the order of several seconds to several minutes.

Often, systems that are described or seen as "real-time" are functionally real-time.

Demography in general is the statistical study of populations, especially human beings (see Wikipedia). As a very general science, it relates to analysing any kind of dynamic living population, i.e., one that changes over time or space. Demography encompasses the study of the size, structure, and distribution of these populations, and spatial or temporal changes in them in response to birth, migration, aging, and death.

Demographic analysis can cover whole societies or groups defined by criteria such as education, nationality, religion, and ethnicity.

Formal demography limits its object of study to the measurement of population processes, while the broader field of social demography or population studies also analyses the relationships between economic, social, cultural, and biological processes influencing a population.

The common variables that are gathered in demographic research include age, sex, income level, race, employment, marital state, occupation, religion, location, home ownership and level of education. Demographics make certain generalizations about groups to identify customers. Additional demographic factors include gathering data on preferences, hobbies, lifestyle and more.

A camera is defined in for instance Wikipedia as an optical instrument for recording or capturing images, which may be stored locally, transmitted to another location, or both. The images may be individual still photographs or sequences of images constituting videos or movies. The camera is a remote sensing device as it senses subjects without any contact. Current cameras are in general digital image recording devices. A camera in general works with the light of the visible spectrum or with other portions of the electromagnetic spectrum. A still camera is an optical device which creates a single image of an object or scene and records it on an electronic sensor. A movie camera or a video camera operates similarly to a still camera, except it records a series of static images in rapid succession, commonly at a rate of 24 frames per second.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

DRAWINGS

Figure 2:
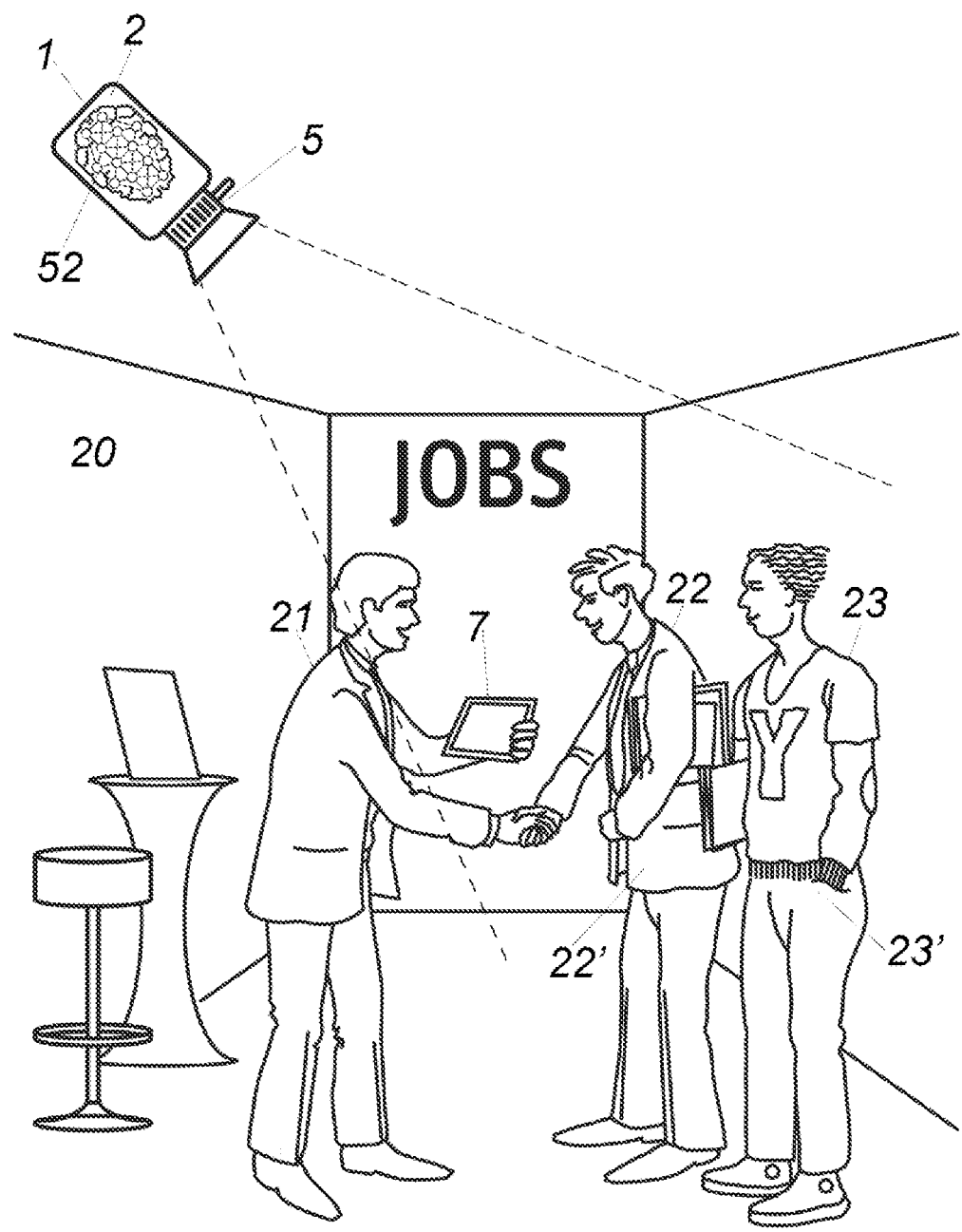
Figure 3:
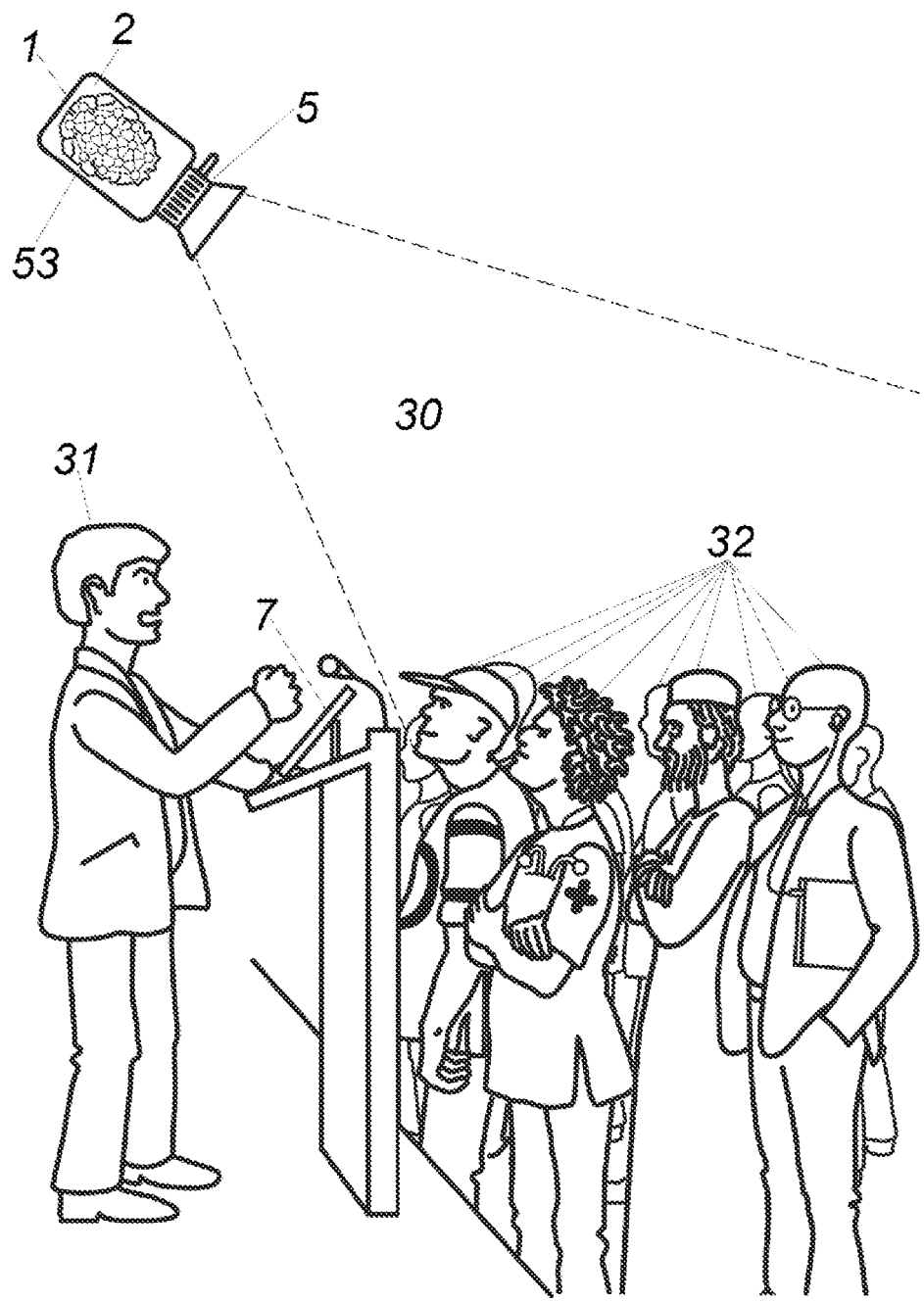
Figure 4A:
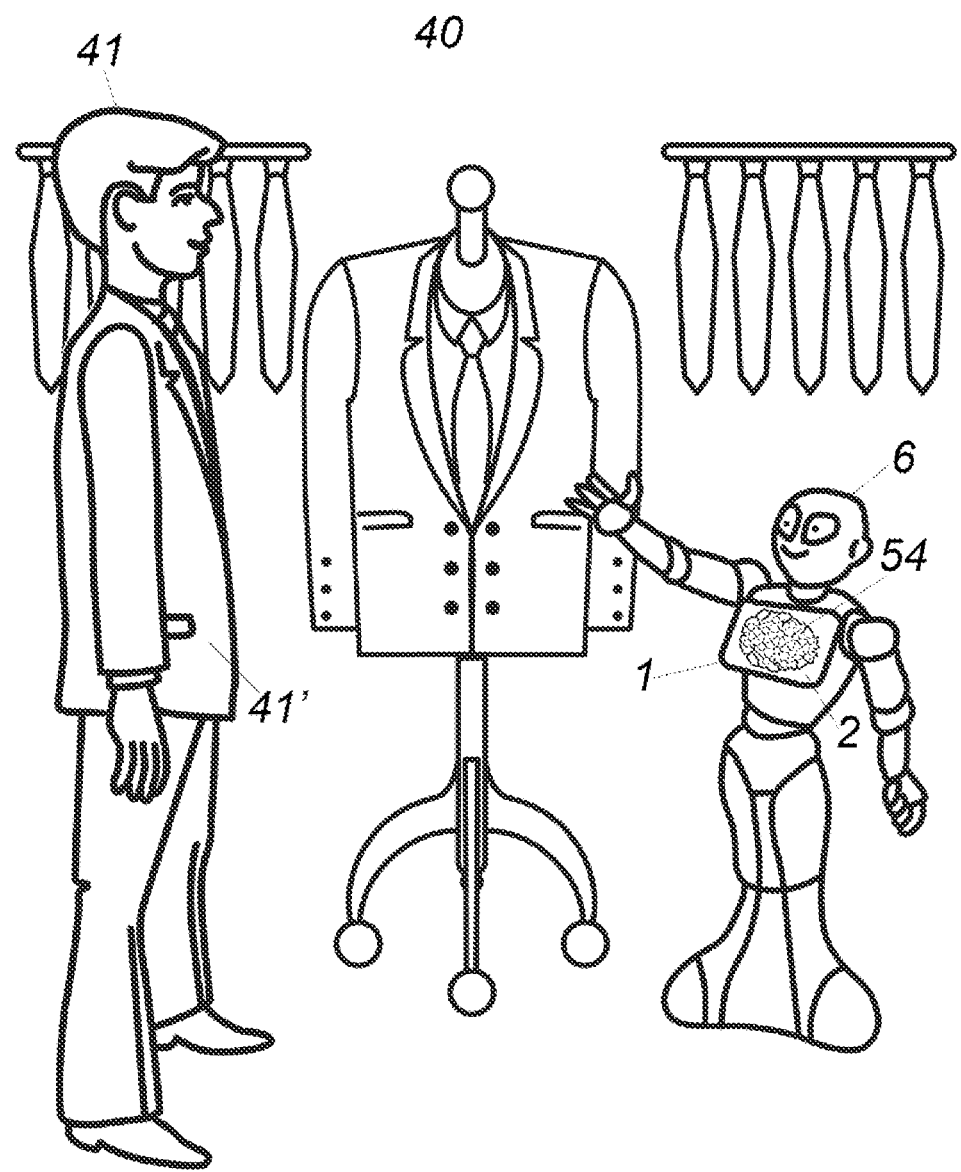
Figure 4B:
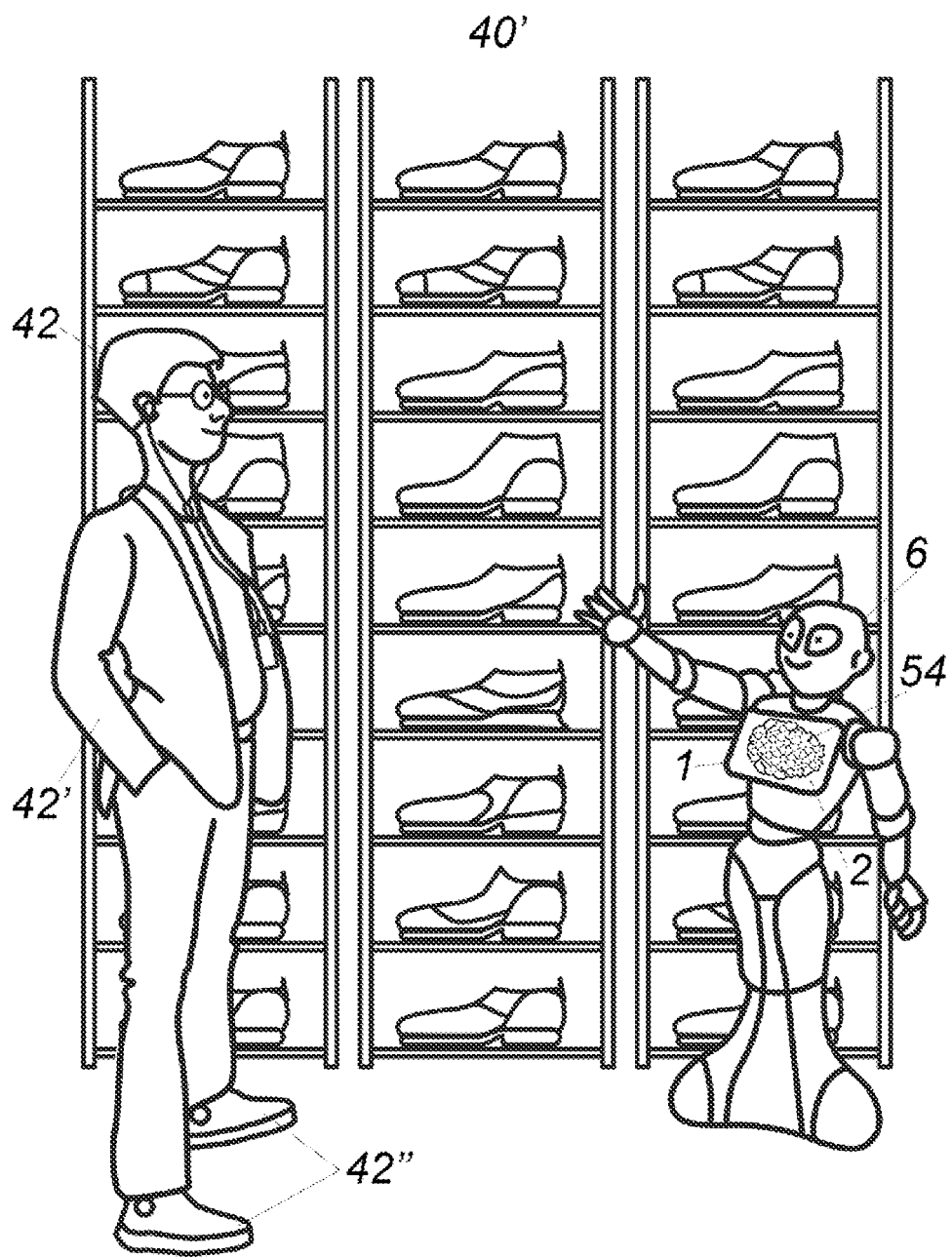

Embodiments of the invention will now be described, by way of example only, with reference to the accompanying schematic drawings (of which, are not necessarily to scale) in which corresponding reference symbols indicate corresponding parts, and in which:

FIG. 1 schematically depicts an embodiment of a video analyzer comprising an artificial intelligence (AI) system, running on a cloud server, for determining the social group a person is belonging to;

FIG. 2 schematically depicts an embodiment of a video analyzer at a job fair, comprising an artificial intelligence (AI) system, integrated in a video camera, for determining the social group a person is belonging to;

FIG. 3 schematically depicts an embodiment of a video analyzer at a gathering comprising an artificial intelligence (AI) system, integrated in a video camera, for determining the demographics of an audience;

FIGS. 4A and 4B respectively schematically depict an embodiment of a video analyzer, comprising an artificial intelligence (AI) system, integrated in a service robot for assisting customers in a department store.

DESCRIPTION

FIG. 1 schematically depicts an embodiment of a video analyzer comprising an AI system 1 comprising a computer system 2, such as a (cloud) server, and operationally coupled to for instance a video camera network of a department store. The AI system 1 analyzes a large series of video streams 10 from the video camera network. In each stream from the video streams 10, the AI system 1 labels a person (11, 12, 13 and 14). Furthermore, the AI system retrieves image parts 4 showing clothing, accessories and haircut of the person (11, 12, 13 and 14) in a video stream. The image parts 4 are subjected to a trained machine learning model, defined in a computer program product running on computer system 2. This results in one or more scores 3 for each person (11, 12, 13 and 14). Based on the scores 3, the AI system 1 retrieves the social group category the person (11, 12, 13 and 14) belongs to. The scores 3 related to person 11 and person 12 indicate they belong to a formally dressed social group with preferences 18 that would fit services 19. The scores 3 related to person 13 and person 14 indicate they belong to a casually dressed social group with preferences 18' that would fit services 19'.

In another embodiment of a video analyzer consisting of an AI system 1 comprising a computer system 2, for instance a (cloud) server, the AI system 1 is operationally coupled to a surveillance network of video cameras. The AI system 1 analyzes a large series of video streams from the surveillance network in order to estimate a person's (criminal) intent based on appearance.

FIG. 2 schematically depicts an embodiment of a video analyzer at a job fair 20. This video analyzer comprises an AI system 1 comprising a computer system 2, integrated in video camera 5. Recruiter 21 is supported by a tablet 7 that is operationally coupled to AI system 1. A computer program product comprising a machine learning model 52 is running on computer system 2. The computer program product retrieves an image of job candidates (22 and 23) with appearances (22' and 23'). It further labels the job candidates (22 and 23). The computer program product further uses the trained machine learning model 52 to categorize the job candidates (22 and 23) in a social group. The computer program product then sends information about the categorized job candidates (22 and 23) to tablet 7. Recruiter 21 uses the information about the categorized job candidates (22 and 23), that is published on the tablet 7, to help each candidate (22 and 23) to get in contact with businesses best suited to their appearance (22' and 23'). Job candidate 22 with appearance 22' and categorized in a formal social group is linked to businesses that are valuing a more formal appearance, while job candidate 23 with appearance 23' and categorized in a fashion social group is linked to businesses that are valuing a more fashionable appearance.

In another embodiment of a video analyzer consisting of an AI system 1 comprising a computer system 2, FIG. 3 schematically depicts an embodiment of a video analyzer at a gathering 30. This video analyzer comprises an AI system 1 comprising a computer system 2, which in this embodiment is integrated in video camera 5. Speaker 31 is supported by a tablet 7 that is operationally coupled to AI system 1. A computer program product comprising a machine learning model 53 is executed on computer system 2. The computer program product retrieves an image of the crowd 32 consisting of various individuals with different appearances. The computer program product labels the individuals in the image and subjects the image, as a whole or in parts, with labeled individuals to the trained machine learning model 53 in order to categorize the crowd 32, based on appearance, in one or more social groups. Alternatively or in combination, based on appearance, the computer program product categorizes each individual in one or more social groups. Subsequently, the AI system 1 sends information about the categorized crowd 32 or individuals to tablet 7. An app (or part of the computer program product) running on tablet 7 analyzes the information received from AI system 1 and informs speaker 31 about the demographics of the crowd 32. This allows speaker 31 to tune its message to the interest of the crowd.

FIG. 4A-4B schematically depict an embodiment of a video analyzer, comprising an AI system 1, here integrated in a service robot 6 for assisting customers (41 and 42), in a department store (40 and 40') based on their appearances (41' and 42'). AI system 1 comprises a computer system 2 running a computer program product that defines a trained machine learning model 54.

In FIG. 4A, service robot 6 has met a traditionally dressed customer 41. This customer is looking for a new outfit in a department store. Based on customer's appearance 41', AI system 1 estimates the preferences of customer 41 and shows customer 41 the collection of clothes at the department 40 for traditional menswear.

In FIG. 4B, service robot 6 has met modernly dressed customer 42. This customer is also looking for a new outfit in the department store. Based on customer's appearance 42' and customer's highly fashionable shoes 42", AI system 1 estimates the preferences of customer 41 and shows customer 41 the new collection of shoes at the department 40' for designer clothing.

In yet another embodiment of a video analyzer comprising an AI system 1, the video analyzer is integrated in a surveillance robot in order to estimate a person's (criminal) intent based on appearance.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

What is claimed is:

1. An artificial intelligence (AI) system for determining to which social group a person belongs, said AI system comprising:
   a computer system; and
   a computer program product which, when running on said computer system:
      retrieves at least one image of said person belonging to a social group;
      labels said person in said at least one image, resulting in a labeled person;
      retrieves at least one image part showing appearance of said labeled person;
      subjects said at least one image part to at least one trained machine learning model defined in said computer program product, said at least one trained machine learning model comprising:
         at least a part that is trained to detect key points on the body of said labeled person;

a part that is trained to segment said body into relevant body parts;

a part that is trained to detect clothing on the segmented said relevant body parts, and at least a part that is trained on a test set of annotated images which are annotated with respect to said detected clothing that correlate to a social group, and determines from said at least one trained machine learning model a social group category to which the labeled person belongs.

2. The AI system of claim 1, wherein said clothing comprises accessories, at least one of said accessories selected from clothes, shoes, glasses, jewelry, and watches.

3. The AI system of claim 1, wherein said at least one trained machine learning model also comprises a part that is trained to determine a head in said relevant body parts, and detects at least one selected from makeup, glasses, jewelry, dental brace, and hairstyle of a person.

4. The AI system according to claim 1, wherein said AI system retrieves at least one image comprising a series of persons, and for said series of persons determines said social group category.

5. The AI system of claim 4, further comprising a statistical analyzer for applying a statistical analysis on said social group categories of said series of persons for determining demographics of said series of persons.

6. The AI system of claim 1, wherein said AI system determines said social group categories real-time.

7. A robot system comprising:

a humanoid robot for interacting with human beings;

an artificial intelligence (AI) system operatively connected to the humanoid robot, and which is for determining to which social group a person belongs, said AI system including:

a computer system; and a computer program product which, when running on said computer system:

retrieves at least one image of said person belonging to a social group;

labels said person in said at least one image, resulting in a labeled person;

retrieves at least one image part showing appearance of said labeled person;

subjects said at least one image part to at least one trained machine learning model defined in said computer program product, said at least one trained machine learning model comprising:

at least a part that is trained to detect key points on the body of said labeled person;

a part that is trained to segment said body into relevant body parts;

a part that is trained to detect clothing on the segmented said relevant body parts, and at least a part that is trained on a test set of annotated images which are annotated with respect to said detected clothing that correlate to a social group, and determines from said at least one trained machine learning model a social group category to which the labeled person belongs.

8. A camera, comprising:

an artificial intelligence (AI) system for determining to which social group a person belongs, said AI system including:

a computer system; and a computer program product which, when running on said computer system:

retrieves at least one image of said person belonging to a social group;

labels said person in said at least one image, resulting in a labeled person;

retrieves at least one image part showing appearance of said labeled person;

subjects said at least one image part to at least one trained machine learning model defined in said computer program product, said at least one trained machine learning model comprising:

at least a part that is trained to detect key points on the body of said labeled person;

a part that is trained to segment said body into relevant body parts;

a part that is trained to detect clothing on the segmented said relevant body parts, and at least a part that is trained on a test set of annotated images which are annotated with respect to said detected clothing that correlate to a social group, and determines from said at least one trained machine learning model a social group category to which the labeled person belongs.

9. The camera of claim 8, further comprising a housing to house said AI system.

* * * * *